(12) United States Patent
Kitaori et al.

(10) Patent No.: US 8,630,775 B2
(45) Date of Patent: Jan. 14, 2014

(54) AUTOMATIC TRANSMISSION CONTROL APPARATUS AND METHOD

(75) Inventors: Ichiro Kitaori, Nagoya (JP); Seiji Kuwahara, Toyota-shi (JP); Hiroyuki Sawada, Okazaki-shi (JP); Kazuyuki Shiiba, Toyota-shi (JP); Toshihiro Fukumasu, Nagoya-shi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 347 days.

(21) Appl. No.: 12/680,673

(22) PCT Filed: Sep. 23, 2008

(86) PCT No.: PCT/IB2008/002465
§ 371 (c)(1),
(2), (4) Date: Jul. 9, 2010

(87) PCT Pub. No.: WO2009/040625
PCT Pub. Date: Apr. 2, 2009

(65) Prior Publication Data
US 2010/0292899 A1    Nov. 18, 2010

(30) Foreign Application Priority Data

Sep. 28, 2007   (JP) ................................ 2007-255275

(51) Int. Cl.
*G06F 7/00*  (2006.01)
*G06F 17/00* (2006.01)
*G06F 19/00* (2011.01)

(52) U.S. Cl.
USPC ................ 701/52; 701/54; 477/107; 477/110

(58) Field of Classification Search
USPC .......... 701/51–54, 61; 477/98, 107, 110–112, 477/115; 123/366, 685, 686
See application file for complete search history.

(56) References Cited

U.S. PATENT DOCUMENTS 4,713,987 A   12/1987   Matsumura
5,069,084 A   12/1991   Matsuno et al.
(Continued)

FOREIGN PATENT DOCUMENTS

DE    40 06 062 A1   8/1991
DE    196 07 932 A1  9/1996
(Continued)

OTHER PUBLICATIONS

Office Action issued Jan. 31, 2011, in German Patent Application No. 11 2008 002 603.3-14 (with English Translation).

*Primary Examiner* — Jeffrey Shapiro
(74) *Attorney, Agent, or Firm* — Oblon, Spivak, McClelland, Maier & Neustadt, L.L.P.

(57) ABSTRACT

When an automatic transmission is in a manual mode, a transmission ECU calculates a speed sftrng manually requested by the driver and a speed sftrngmap set by a shift map and then performs a shift prohibition procedure. In this procedure, if the engine coolant temperature is equal to or lower than a predetermined coolant temperature or the AT fluid temperature is equal to or lower than a predetermined fluid temperature, a prohibition, determination flag xthlow is set to "on", and if the engine coolant temperature is higher than the predetermined coolant temperature and the AT fluid temperature is higher than the predetermined fluid temperature, the prohibition determination flag xthlow is set to "off". When the prohibitions determination flag xthlow is "on", the speed sftrngmap is set as the upper limit of the speed sftrng.

10 Claims, 7 Drawing Sheets

(56) References Cited

U.S. PATENT DOCUMENTS

| | | | |
|---|---|---|---|
| 5,131,293 A | 7/1992 | Kaiser et al. | |
| 5,593,364 A | 1/1997 | Ishii et al. | |
| 5,676,619 A * | 10/1997 | Ohashi et al. | 477/98 |
| 7,267,633 B2 * | 9/2007 | Hitch et al. | 477/98 |
| 7,972,244 B2 * | 7/2011 | Gierling et al. | 477/127 |
| 2001/0032044 A1 * | 10/2001 | Hanawa et al. | 701/51 |
| 2002/0096137 A1 * | 7/2002 | Kobayashi et al. | 123/179.4 |
| 2003/0213296 A1 | 11/2003 | Kaigawa et al. | |
| 2004/0029678 A1 * | 2/2004 | Kayukawa et al. | 477/15 |
| 2005/0003928 A1 * | 1/2005 | Niki et al. | 477/5 |
| 2006/0149433 A1 * | 7/2006 | Otsubo et al. | 701/29 |
| 2007/0155581 A1 * | 7/2007 | Tabata et al. | 477/3 |
| 2008/0305927 A1 * | 12/2008 | Gierling et al. | 477/97 |

FOREIGN PATENT DOCUMENTS

| | | | |
|---|---|---|---|
| DE | 100 32 906 A1 | 3/2001 | |
| DE | 103 13 579 A1 | 10/2003 | |
| EP | 0 415 024 | 3/1991 | |
| JP | 59 43247 | 3/1984 | |
| JP | 6 123346 | 5/1994 | |
| JP | 7 19332 | 1/1995 | |
| JP | 2005 351482 | 12/2005 | |
| WO | WO 2006/119868 A1 * | 11/2006 | F16H 61/16 |

* cited by examiner

|     | C1 | C2 | C3 | C4  | B1  | B2  | B3 | B4  | F1  | F2 | F3 | F4 |
|-----|----|----|----|-----|-----|-----|----|-----|-----|----|----|----|
| P   |    |    |    |     |     |     |    |     |     |    |    |    |
| R   |    |    | O  |     | (O) |     |    | O   | O   |    |    |    |
| N   |    |    |    |     |     |     |    |     |     |    |    |    |
| 1st | O  |    |    | (O) |     |     |    | (O) |     |    | O  | O  |
| 2nd | O  |    |    | (O) |     | (O) | O  |     | O   | O  |    | O  |
| 3rd | O  |    | O  | (O) | (O) |     | △  |     | O   |    |    | O  |
| 4th | O  | O  | △  | (O) |     |     | △  |     |     |    |    | O  |
| 5th | △  | O  | O  |     | O   |     | △  |     |     |    |    |    |
| 6th | △  | O  |    |     | △   | O   | △  |     |     |    |    |    |

O: APPLIED  (O): APPLIED UPON ENGINE BRAKE
△: APPLIED (NOT FOR DRIVE FORCE TRANSMISSION)

| SHIFT LEVER POSITION | INDICATION AT INDICATOR | SPEED |
|---|---|---|
| D | OFF | 1, 2, 3, 4, 5, 6 |
| M | 6 | 1, 2, 3, 4, 5, 6 |
| | 5 | 1, 2, 3, 4, 5 |
| | 4 | 1, 2, 3, 4 |
| | 3 | 1, 2, 3 |
| | 2 | 1, 2 |
| | 1 | 1 |

AUTOMATIC TRANSMISSION CONTROL APPARATUS AND METHOD

BACKGROUND OF THE INVENTION

1. Field of the Invention

The invention relates to an automatic transmission control apparatus and more particularly to an automatic transmission control apparatus and method that accelerates the warming-up of an internal combustion engine.

2. Description of the Related Art

Automatic transmission control apparatuses have been proposed which have an automatic shift mode in which the automatic transmission is automatically shifted (hereinafter will be referred to as "automatic mode") and a manual shift mode in which the driver manually changes the shift range of the automatic transmission (hereinafter will be referred to as "manual mode"). According to such automatic transmission control apparatuses, the driver can manually switch the shift mode of the automatic transmission between the automatic mode and the manual mode (for example, refer to Japanese Patent Application Publication No. 2004-60734 (JP-A-2004-60734)).

According to the above-described automatic transmission control apparatuses, the automatic transmission is normally operated in the automatic mode that does not require any manual operation by the driver. On the other hand, when the manual mode is selected, the automatic transmission is controlled through the shift lever operation by the driver. Thus, in the manual mode, the driver can more freely accelerate the vehicle and apply engine brake, thus controlling the driving of the vehicle just as he or she desires.

In recent years, in an attempt to solve the problem that the combustion efficiency is low and emissions (e.g., carbon dioxides, nitrogen oxides) therefore increase when the temperature of coolant of an internal combustion engine is low, an automatic transmission control apparatus has been proposed which, although not having a manual mode, switches the shift point table from a normal shift point table to a warming-up acceleration shift point table in which the shift points are shifted to the high speed side and performs shift control using said map when the temperature of engine coolant is low (for example, refer to Japanese Patent Application Publication No. 06-123346 (JP-A-06-123346)).

According to the automatic transmission control apparatus of JP-A-2004-60734, however, in the manual mode, the automatic transmission is controlled through the shift lever operation by the driver and therefore the drive state requested by the driver can be established. In the manual mode, however, the driver can shift up the transmission just as he or she desires even in a state where the internal combustion engine needs to be warmed up, and this makes it difficult to accelerate the warming-up of the internal combustion engine sufficiently.

According to the automatic transmission control apparatus of JP-A-06-123346, the shift point table is switched from the normal shift point map to the warming-up acceleration shift point map upon shift control for the automatic transmission. That is, this publication does not take into consideration automatic transmissions having manual modes. Therefore, if the driver manually shifts up the automatic transmission, the engine speed decreases and this delays the warming-up of the internal combustion engine.

SUMMARY OF THE INVENTION

The invention provides an automatic transmission control apparatus and method that enables accelerating the warming-up of an internal combustion engine even when the automatic transmission is in the manual mode.

(1) An aspect of the invention relates to an automatic transmission control apparatus for an automatic transmission incorporated in a vehicle to transmit drive force produced by an internal combustion engine and having an automatic shift mode in which a speed of the automatic transmission is automatically selected based on the drive state of the vehicle and a manual shift mode in which the speed of the automatic transmission is selected according to a manual operation. This automatic transmission control apparatus has: a drive-state detection portion that detects the drive state of the vehicle; a manual operation request detection portion that detects the speed of the automatic transmission requested by the manual operation; a warming-up determination portion that determines whether the internal combustion engine needs to be warmed up; and a shift prohibition portion that, in a state where the warming-up determination portion has determined that the internal combustion engine needs to be warmed up, prohibits the automatic transmission from being shifted to the speed detected by the manual operation request detection portion if the speed detected by the manual operation request detection portion is higher than the speed that is selected based on the drive state of the vehicle detected by the drive-state detection portion.

According to the automatic transmission control described above, when a manual operation requesting the automatic transmission to be shifted up to a certain speed is performed in the manual mode in a state where the internal combustion engine needs to be warmed up, the automatic transmission is prohibited from being shifted up to the requested speed if it is higher than the speed that is selected based on the drive state of the vehicle, and this accelerates the warming-up of the internal combustion engine while preventing deterioration of the fuel economy and deterioration of the exhaust-gas purification capability which may otherwise be caused when the temperature of the internal combustion engine is low.

(2) The automatic transmission control apparatus described above in (1) may be such that the warming-up determination portion determines that the internal combustion engine needs to be warmed up if the temperature of coolant of the internal combustion engine is equal to or lower than a predetermined value.

In this case, because the coolant temperature of the internal combustion engine is referenced in determining whether to prohibit the automatic transmission from being shifted up to the speed requested by the manual operation if said speed is higher than the speed selected based on the drive state of the vehicle, the warming-up of the internal combustion engine can be accelerated more reliably.

(3) The above-described automatic transmission control apparatuses described above in (1) and (2) may be such that the warming-up determination portion determines that the internal combustion engine needs to be warmed up if the temperature of fluid of the automatic transmission is equal to or lower than a predetermined value.

In this case, because the coolant temperature of the internal combustion engine is referenced in determining whether to prohibit the automatic transmission from being shifted up to the speed requested by the manual operation if said speed is higher than the speed selected based on the drive state of the vehicle, the warming-up of the internal combustion engine can be accelerated more reliably.

The automatic transmission control apparatuses described above in (1) to (3) may further have a determination portion that determines whether the coolant temperature and the fluid temperature are within allowable ranges, and when the coolant temperature is out of the allowable range or the fluid temperature is out of the allowable range, the shift prohibition portion may allow the automatic transmission to be shifted to the speed detected by the manual operation request detection portion even if the speed detected by the manual operation request detection portion is higher than the speed selected based on the drive state of the vehicle.

According to this structure, when the coolant temperature detected by an coolant temperature sensor is out of the allowable range or when the fluid temperature detected by an AT fluid temperature sensor is out of the allowable range, the sensor is determined to be faulty, and the automatic transmission is allowed to be shifted up to the speed detected by the manual operation request detection portion even if said speed is higher than the speed selected based on the drive state of the vehicle, that is, the driver can shift up the automatic transmission as he or she desires and thus the drivability is high.

Another aspect of the invention relates to a method for controlling an automatic transmission incorporated in a vehicle to transmit drive force produced by an internal combustion engine and having an automatic shift mode in which a speed of the automatic transmission is automatically selected based on the drive state of the vehicle and a manual shift mode in which the speed of the automatic transmission is selected according to a manual operation. This method includes: detecting the drive state of the vehicle; detecting the speed of the automatic transmission requested by the manual operation; determining whether the internal combustion engine needs to be warmed up; and prohibiting, in a state where the internal combustion engine needs to be warmed up, the automatic transmission from being shifted to the speed requested by the manual operation if the speed requested by the manual operation is higher than a speed that is selected based on the detected drive state of the vehicle.

Thus, the automatic transmission control apparatuses and method according to the above-described aspects of the invention enable accelerating the warming-up of the internal combustion engine even when the automatic transmission is in the manual mode.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Hereinafter, an example embodiment of the invention will be described with reference to the accompanying drawings.

Figure 1:
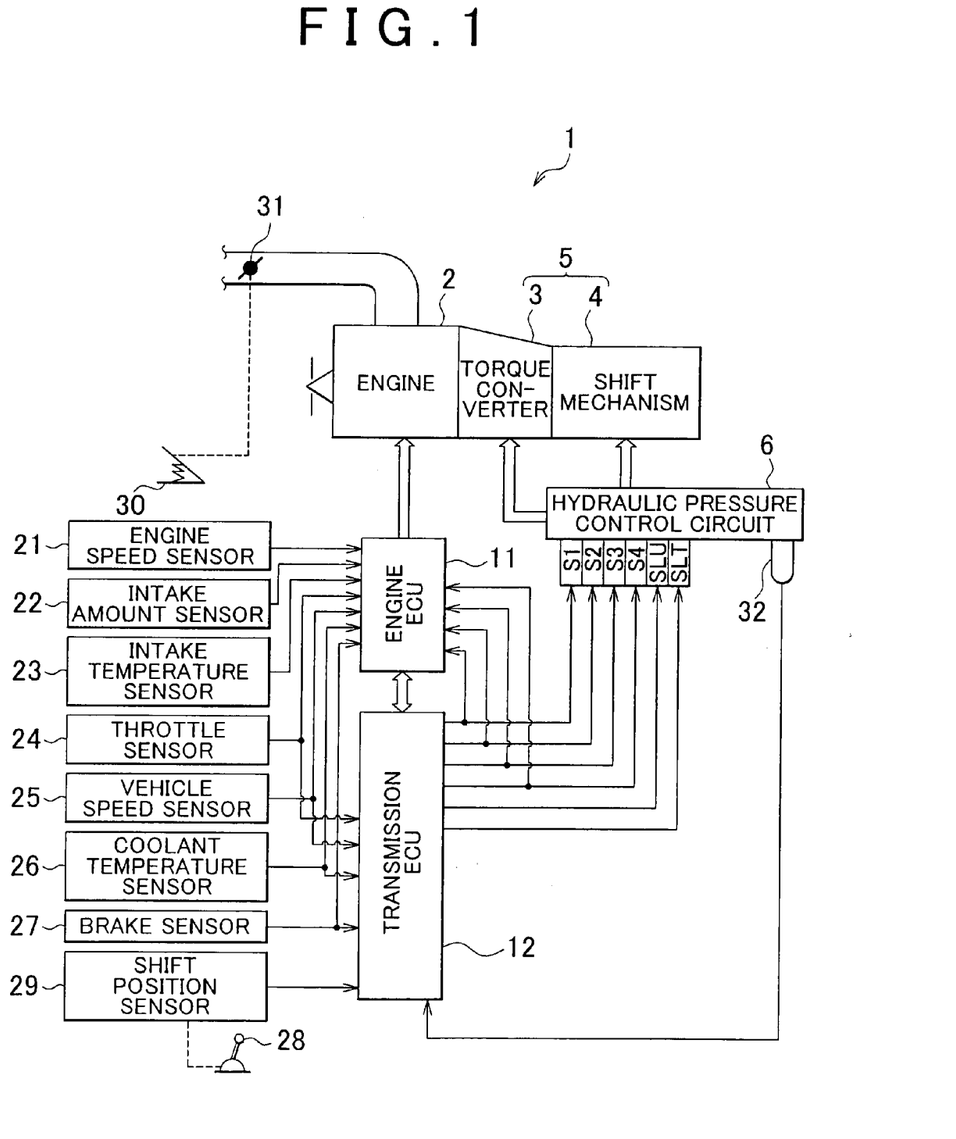
FIG. 1 is a view schematically showing the configuration of a vehicle incorporating an automatic transmission control apparatus according to an example embodiment of the invention.
Figure 2:
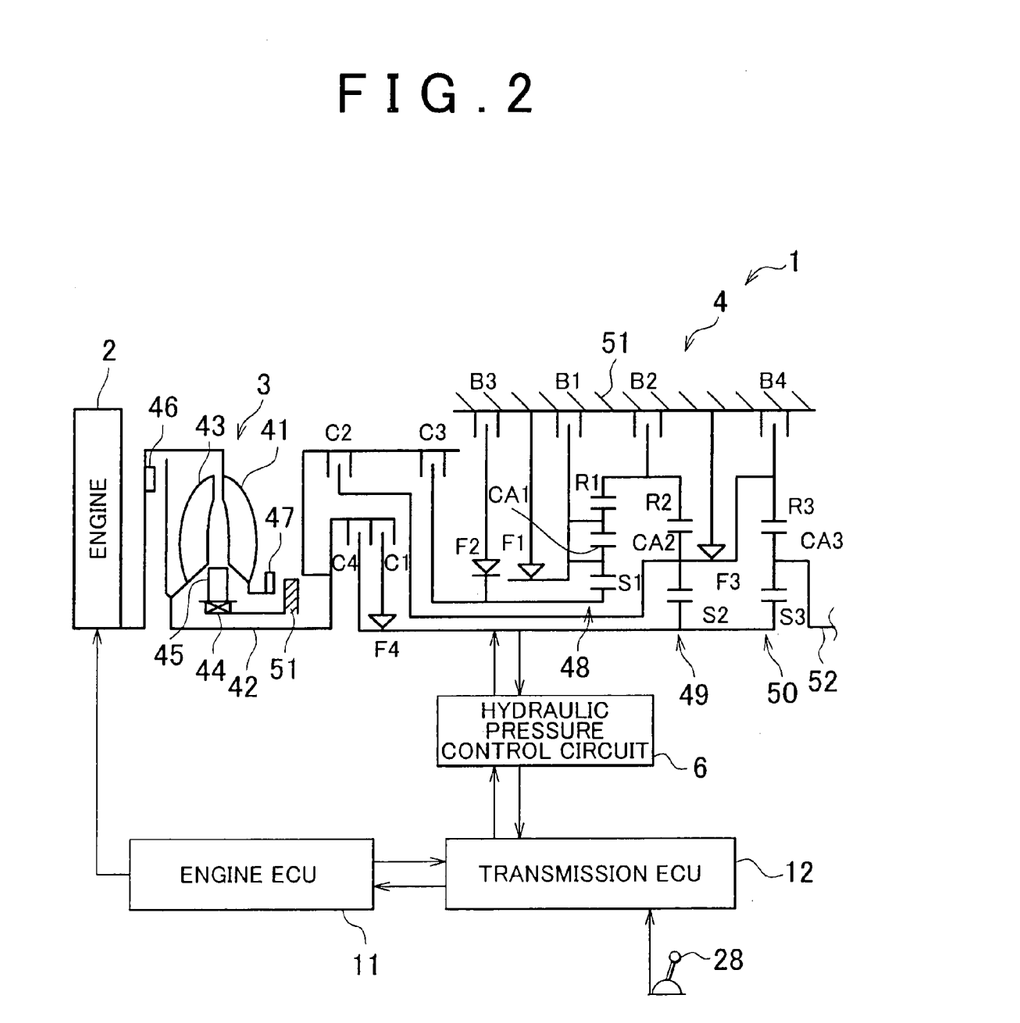
FIG. 2 is a view schematically showing the structure of the automatic transmission control apparatus of the example embodiment of the invention.
Figure 3:
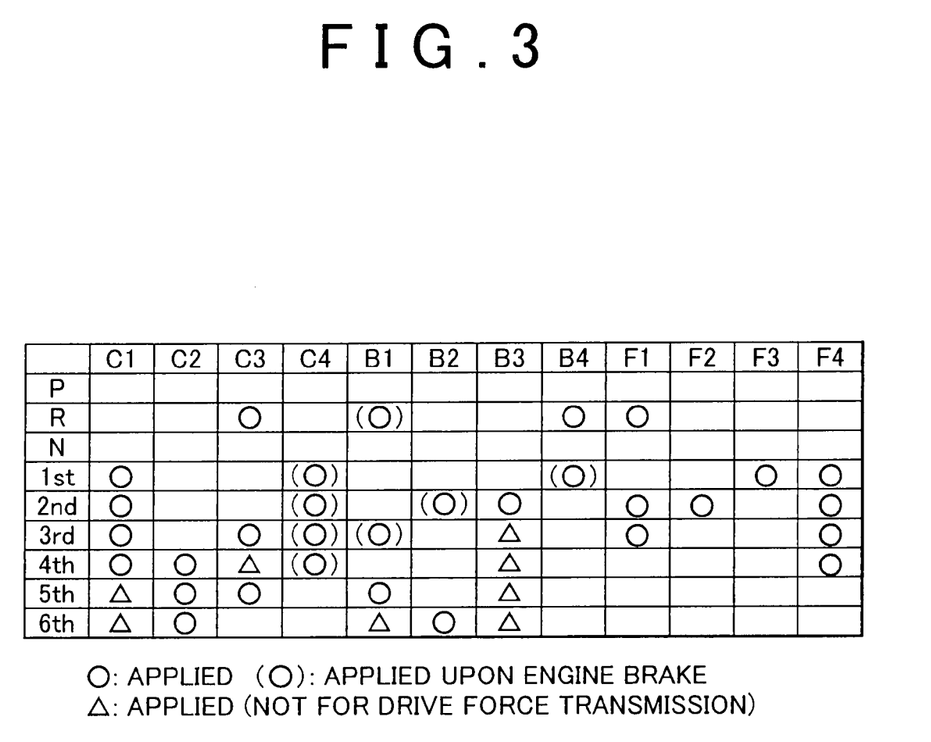
FIG. 3 is an application chart of the automatic transmission of the example embodiment of the invention.

FIG. 1 is a view schematically showing the configuration of a vehicle incorporating an automatic transmission control apparatus according to an example embodiment of the invention. FIG. 2 is a view schematically showing the structure of the automatic transmission control apparatus of the example embodiment. FIG. 3 is an application chart of the automatic transmission of the example embodiment. The automatic transmission control apparatus of the example embodiment is incorporated in an FR (Front-engine Rear-drive) vehicle.

Referring to FIG. 1 and FIG. 2, a vehicle 1 has an engine 2 that is an internal combustion engine, a torque converter 3 that increases the rotational torque output from the engine 2, and a shift mechanism 4 that transmits the rotation of the output shaft of the torque converter 3 while changing its speed as needed. The rotational torque output from the shift mechanism 4 is transmitted to drive wheels via a differential unit not shown in the drawings.

The engine 2 incorporates a known drive structure that produces drive force by combusting fuel (e.g., gasoline, light oil). The torque converter 3 and the shift mechanism 4 together constitute an automatic transmission 5.

Referring to FIG. 1 and FIG. 2, the torque converter 3 is provided between the engine 2 and the shift mechanism 4. The torque converter 3 has a pump impeller 41 coupled with the output shaft of the engine 2, a turbine impeller 41 coupled with an input shaft 42 of the shift mechanism 4, a stator impeller 45 supported by a one-way clutch 44 so as to rotate only in one direction. Drive force is transmitted between the pump impeller 41 and the turbine impeller 43 via fluid.

Further, the torque converter 3 has a lock-up clutch 46 for directly coupling the pump impeller 41 and the turbine impeller 43 together. When the vehicle 1 is running at a high speed, the pump impeller 41 and the turbine impeller 43 are mechanically, and directly, coupled with each other by the lock-up clutch 46 to improve the efficiency of drive force transmitted from the engine 2 to the shift mechanism 4. If necessary, the torque converter 3 may be placed in a so-called "flex-lockup" state where the lock-up clutch 46 slips at a given slip rate.

An oil pimp 47 is provided at the pump impeller 41. The oil pump 47 is a mechanical pump used to produce the hydraulic pressure for shifting the shift mechanism 4 and the hydraulic pressure for distributing lubricant to respective portions.

The shift mechanism 4 has a first planetary gear set 48 that is of a double-pinion type and a second planetary gear set 49 and a third planetary gear set 50 that are of a single-pinion type. A sun gear S1 of the first planetary gear set 48 is selectively coupled with the input shaft 42 via a clutch C3 and selectively coupled with a housing 51 via a one-way clutch F2 and a brake B3. Supported by the one-way clutch F2, the sun gear S1 does not rotate in the direction opposite to the rotational direction of the input shaft 42 (will hereinafter be referred to as "opposite rotational direction").

A carrier CA1 of the first planetary gear set 48 is selectively coupled with the housing 51 via a brake B1. The carrier CA1 is supported by a one-way clutch F1, which is provided in parallel with the brake B1, so as not to rotate in the opposite rotational direction in any state.

A ring gear R1 of the first planetary gear set 48 is coupled with a ring gear R2 of the second planetary gear set 49 and selectively coupled with the housing 51 via, a brake B2. A sun gear S2 of the second planetary gear set 49 is coupled with a sun gear S3 of the third planetary gear set 50 and selectively coupled with the input shaft 42 via a clutch C4. The sun gear S2 is selectively coupled with the input shaft 42 via a one-way clutch F4 and the clutch C1 so as not to rotate in the opposite rotational direction.

A carrier CA2 of the second planetary gear set 49 is coupled with a ring gear R3 of the third planetary gear set 50 and selectively coupled with the input shaft 42 via a clutch C2 and with the housing 51 via a brake B4. The carrier CA2 is supported by a one-way clutch F3, which is provided in parallel with the brake B4, so as not to rotate in the opposite rotational direction. A carrier CA3 of the third planetary gear set 50 is coupled with an output shaft 52.

In this specification, the clutches C1 to C4 and the brakes B1 to B4 will be collectively referred to as "clutches C" and "brakes B" unless a specific one or more of them needs to be identified. The clutches C and the brakes B are hydraulic friction-coupling devices (e.g., multi-disc clutches and brakes) that are applied by hydraulic actuators. The clutches C and the brakes B are each placed in an applied state or a released according to the path of a hydraulic circuit that changes depending upon transmission solenoids S1 to S4 and linear solenoids SLT, SLU of a hydraulic pressure control circuit 6 (will be described later) being excited or not and depending upon the operation state of a manual valve, not shown in the drawings. Therefore, the speed established at the shift mechanism 4 changes depending upon the combination of the application states of the clutches C and the brakes B (applied or released) as shown in FIG. 3. The shift mechanism 4 has six forward-drive speeds (1st to 6th speeds) and a reverse-drive speed.

The hydraulic pressure control circuit 6 of the vehicle 1 is used to hydraulically control the rate at which torque is increased at the torque converter 3 and the speed at the shift mechanism 4. The hydraulic pressure control circuit 6 has the transmission solenoids S1 to S4, the linear solenoids SLT, SLU, and an AT fluid temperature sensor for detecting the temperature of the hydraulic fluid.

The vehicle 1 has an engine speed sensor 21 for detecting the speed of the engine 2, an intake amount sensor 22 for detecting the amount of intake air supplied to the engine 2, an intake temperature sensor for detecting the temperature of the intake air supplied to the engine 2, a throttle sensor 24 for detecting the degree of opening of a throttle valve 31, a vehicle speed sensor 25 for detecting the vehicle speed based on the rotation speed of the output shaft 52 of the shift mechanism 4, a coolant temperature sensor 26 for detecting the temperature of the coolant of the engine 2, and a brake sensor 27 for detecting the depression force on the brake pedal. Further, the vehicle 1 has a shift lever 28, a shift position sensor for detecting the position of the shift position sensor 29, and an accelerator operation amount sensor 30 for detecting the accelerator operation amount.

The engine speed sensor 21 detects the speed of the engine 2 based on the rotation of the crankshaft not shown in the drawings.

The throttle sensor 24 is constituted of, for example, a hall element that outputs voltage corresponding to the opening degree of the throttle valve 31. Thus, the throttle sensor 24 outputs signals indicating the opening degree of the throttle valve 31 to an engine ECU 11 and to a transmission ECU 12, which will be described later.

The vehicle speed sensor 25 outputs signals indicating the vehicle speed, which correspond to the rotation speed of the output shaft of the automatic transmission 5, to the engine ECU 11 and to the transmission ECU 12.

The brake sensor 27 detects a change in the pressure of a master cylinder that changes according to the depression force that the driver applies to the brake pedal or detects the travel of the brake pedal depressed by the driver. The brake sensor 27 outputs electric signals indicating the detected depression force on the brake pedal to the engine ECU 11 and to the transmission ECU 12.

The shift position sensor 29 detects the position of the shift lever 28 operated by the driver.

The accelerator operation amount sensor 30 is, for example, an electronic position sensor constituted of a hole element and outputs, as the accelerator pedal of the vehicle 1 is operated by the driver, signals indicating the operation amount of the accelerator pedal, which is determined from the travel of the accelerator pedal, to the engine ECU 11 and to the transmission ECU 12.

The vehicle 1 has the engine ECU (Electronic Control Unit) 11 for electronically controlling the engine 2 and the transmission ECU 12 for electronically controlling the automatic transmission 5. The engine ECU 11 and the transmission ECU 12 control the engine 2 and the automatic transmission 5, respectively, using various data obtained from the above-described sensors (e.g., the vehicle speed, the opening degree of the throttle valve 31) and using shift maps describing shift lines and shift control programs stored in the ROM.

The engine ECU 11 has a CPU (Central Processing Unit), a RAM (Random Access Memory), a ROM (Read Only Memory), an input interface, and an output interface, which are not shown in the drawings, and outputs various engine control signals to the engine 2 such that the engine 2 runs according to the operation amount of the accelerator pedal.

The engine ECU 11 is connected to the engine speed sensor 21, the intake amount sensor 22, the intake temperature sensor 23, the throttle sensor 24, the vehicle speed sensor 25, the coolant temperature sensor 26, and the brake sensor 27. From these sensors, the engine ECU 11 receives signals indicating the engine speed, the intake amount, the intake temperature, the throttle opening degree, the vehicle speed, the coolant temperature, and the depression force on the brake pedal.

The transmission ECU 12 has a CPU, a RAM, a ROM, an input interface, and an output interface, which are not shown in the drawings. The transmission ECU 12 receives signals indicating the throttle opening degree from the throttle sensor 24, signals indicating the vehicle speed from the vehicle speed sensor 25, signals indicating the coolant temperature from the coolant temperature sensor 26, signals indicating the brake-pedal depression force from the brake sensor 27, signals indicating the position of the shift lever 28 from the shift position sensor 29, and signals indicating the fluid temperature from the AT-fluid temperature sensor 32. Based on these signals, the transmission ECU 12 controls the hydraulic pressure control circuit 6 so as to control the state of the torque converter 3 and the shifting of the automatic transmission 5.

The ROM of the transmission ECU 12 stores shift maps describing shift lines each defined by the vehicle speed and the throttle opening degree, various shift control programs, and so on.

The transmission ECU 12 has an automatic mode in which the speed of the automatic transmission 5 is automatically selected in accordance with the drive state of the vehicle 1 and a manual mode in which the speed of the automatic transmission 5 is manually selected. The drive state of the vehicle 1 is determined, for example, based on the speed of the vehicle 1, the opening degree of the throttle valve 31, the coolant temperature, and the AT fluid temperature.

As will be described later, the transmission ECU 12 may be regarded as "automatic transmission control apparatus", "drive-state detection portion", "manual operation request detection portion", "shift prohibition portion", and "determination portion" according to the aspects of the invention.

Figure 4:
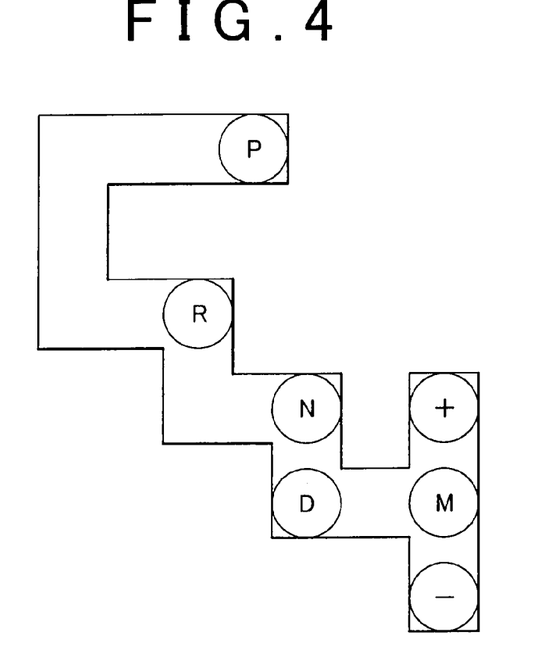
FIG. 4 is a view schematically showing the shift gate positions for the shift lever.

FIG. 4 is a view schematically showing the shift gate pattern for the shift lever 28.

Referring to FIG. 4, the shift gate pattern for the shift lever 28 includes a D position corresponding to the drive range, an N position corresponding to the neutral range, an R position corresponding to the reverse-drive range, and a P position corresponding to the parking range, and the shift lever 28 is shifted according to the shift gate pattern shown in FIG. 4.

The shift gate pattern for the shift lever 28 also includes an M position at which the manual mode is established to allow the automatic transmission 5 to be manually shifted, an upshift position ("+" position") for issuing an upshift command, and a downshift position ("−" position) for issuing a downshift command. That is, the automatic transmission 5 shifts up to a speed higher by one speed in response to the shift lever 28 being shifted to the "+" position and shifts down to a speed lower by one speed in response to the shift lever 28 being shifted to the "−" position. As such, so-called sequential shifting can be performed by operating the shift lever 28.

The M position is located next to the D position. The shift lever 28 is laterally shifted from the D position to the M position and then retained by a spring not shown in the drawings.

What is represented by the sentence "the automatic transmission is shifted by a manual operation" in the claims includes both manually selecting the shift range of the automatic transmission and manually selecting the speed of the automatic transmission.

Here, reference is made to a first example case where the automatic transmission 5 is a so-called "range-hold" type transmission that allows the shift range of the automatic transmission 5 to be manually selected by the driver. In this case, the transmission ECU 12 shifts the shift range of the automatic transmission 5 up and down as the shift lever 28 is shifted to the "+" position and to the "−" position.

Figure 5:
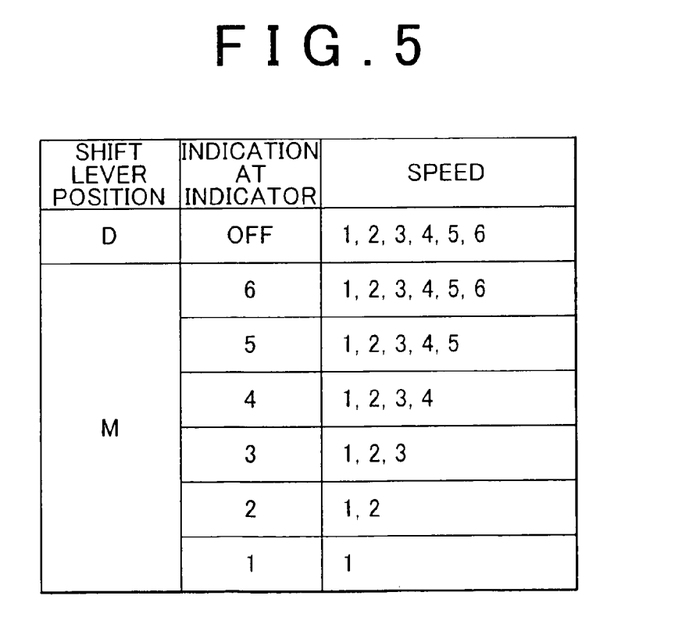
FIG. 5 is a table showing the speeds of each shift range.

The table of FIG. 5 shows the speeds of each shift range.

Referring to FIG. 1, FIG. 2, and FIG. 5, the transmission ECU 12 selects, based on the vehicle speed and the throttle opening degree and using the corresponding shift map, the most appropriate speed from among the first speed up to the highest speed among the speeds of the shift range selected by the driver via the shift lever 28. For example, when the sixth shift range is selected in the manual mode, the transmission ECU 12 shifts the automatic transmission 5 using the first to sixth speeds, and when the fourth shift range is selected, the transmission ECU 12 shifts the automatic transmission 5 using the first to fourth speeds.

In the manual mode, the transmission ECU 12 indicates the shift range selected by the driver via the shift lever 28 on a shift-range indicator in a combination meter not shown in the drawings.

When it is detected via the shift position sensor 29 that the shift lever 28 is presently at the D position, the transmission ECU 12 sets the shift mode of the automatic transmission 5 to the automatic mode. In the automatic mode, the transmission ECU 12 controls the shifting of the automatic transmission 5 via the hydraulic pressure control circuit 6 based on the vehicle speed and the throttle opening degree and using the corresponding shift map describing shift lines. On the other hand, when it is detected via the shift position sensor 29 that the shift lever 28 is presently at the M position, the transmission ECU 12 sets the shift mode of the automatic transmission 5 to the manual mode. In the manual mode, the transmission ECU 12 shifts the automatic transmission 5 using the speeds of the shift range selected by the driver as shown in FIG. 5.

Next, reference is made to a second example case where the automatic transmission 5 is a so-called "speed-hold" type transmission that allows the speed of the automatic transmission 5 to be manually selected by the driver. In this case, the transmission ECU 12 controls the hydraulic pressure control circuit 6 so as to shift the automatic transmission 5 to the speed selected by the driver through operation of the shift lever 28.

In either the first example case or the second example case described above, various shift maps including a normal-drive shift map for normal drive, a power-mode shift map, and a snow-mode shift map are stored in the ROM of the transmission ECU 12. In the automatic mode, the transmission ECU 12 controls the shifting of the automatic transmission 5 using the normal-drive shift map unless otherwise set by the driver.

Further, as will be described later, a warming-up acceleration shift map may be stored in the ROM of the transmission ECU 12.

Hereinafter, structural features of the transmission ECU of the automatic transmission control apparatus according to this example embodiment will be described with reference to FIG. 1 to FIG. 5.

Serving as the controller for the automatic transmission 5, the transmission ECU 12 obtains the speed of the vehicle 1 and the throttle opening degree as the parameters indicating the drive state of the vehicle 1. More specifically, the transmission ECU 12 obtains signals of the throttle sensor 24 indicating the throttle opening degree and signals of the vehicle speed sensor 25 indicating the speed of the vehicle 1 and determines the speed of the vehicle 1 and the throttle opening degree based on the obtained signals.

Alternatively, the transmission ECU 12 may be adapted to determine the throttle opening degree by obtaining the accelerator operation amount from the accelerator operation amount sensor 30 and then applying the obtained accelerator operation amount to a map defining the relation between the accelerator operation amount and the throttle opening degree. In this case, the map defining the relation between the accelerator operation amount and the throttle opening degree is stored in the ROM.

As such, the transmission ECU 12 may be regarded as "drive-state detection portion" for detecting the drive state of the vehicle 1.

The transmission ECU 12 detects manual shift operations of the driver as follows. As the driver shifts the shift lever 28 to the M position, the transmission ECU 12 obtains signals from the shift position sensor 29 indicating that the shift lever 28 is presently at the M position, and then the transmission ECU 12 changes the shift mode of the automatic transmission 5 from the automatic mode to the manual mode. Then, as the driver shifts the shift lever 28 to the "+" position or to the "−" position, the transmission ECU 12 obtains signals of the shift position sensor 29 indicating that the shift lever 28 is presently at the "+" position or at the "−" position. In this case, the transmission ECU 12 maintains the manual mode.

As such, the transmission ECU 12 may be regarded as "manual operation request detection portion" that detects requests that the driver makes through manual operations.

The transmission ECU 12 determines whether the engine 2 needs to be warmed up. The transmission ECU 12 makes this determination based on the temperature of the coolant of the engine 2 and the temperature of the AT fluid of the automatic transmission 5, which are detected as mentioned earlier. More specifically, the transmission ECU 12 obtains signals of the coolant temperature sensor 26 indicating the temperature of the coolant of the engine 2 and signals of an AT fluid temperature sensor 32 indicating the temperature of the AT fluid of the automatic transmission 5.

If the detected coolant temperature is equal to or lower than a threshold α and/or the detected AT fluid temperature is equal to or lower than a threshold β, the transmission ECU 12 determines that the automatic transmission 5 needs to be warmed up.

As such, the transmission ECU 12 may be regarded as "warming-up determination portion" that determines whether the engine 2 needs to be warmed up. Note that the temperature of the AT fluid of the automatic transmission 5 may be regarded as one example of "fluid temperature" cited in the claims.

The values of the thresholds α and β are stored in the ROM. These values have been empirically determined so as to prevent deterioration of the fuel economy and deterioration of the exhaust-gas purification capability which may otherwise be caused when the temperature of the engine 2 is low.

In a state where it is determined that the engine 2 needs to be warmed up, if the signals input from the shift position sensor 29 are indicating that the driver is requesting the automatic transmission 5 to be shifted up to a speed higher than the speed selected based on the drive state of the vehicle 1, the transmission ECU 12 prohibits the automatic transmission 5 from being shifted up to the speed requested by the driver.

More specifically, when it is determined that the engine 2 needs to be warmed up while the shift mode of the automatic transmission 5 is in the manual mode, the transmission ECU 12 records, in the RAM, sftrng representing the speed selected based on the signals from the shift position sensor 29 detected as described above and records sftrngmap representing the speed selected based on the drive state of the vehicle 1 detected as described above and using the normal-drive shift map.

The transmission ECU 12 compares sftrng and sftrngmap recorded in the RAM. At this time, if sftrng is larger than sftrngmap, the transmission ECU 12 shifts the automatic transmission 5 to the speed indicated by sftrngmap.

As such, the transmission ECU 12 may be regarded as "shift prohibition portion" that, when the warming-up determination portion determines that the engine 2 needs to be warmed up, prohibits the automatic transmission 5 from being shifted to the speed detected by the manual operation request detection portion if the speed detected by the manual operation request detection portion is higher than the speed that is selected based on the drive state of the vehicle 1 detected by the drive-state detection portion.

Meanwhile, the transmission ECU 12 determines whether the coolant temperature obtained from the coolant temperature sensor 26 and the AT fluid temperature obtained from the AT fluid temperature sensor 32 are within allowable ranges. More specifically, if the coolant temperature obtained from the coolant temperature sensor 26 and the AT fluid temperature obtained from the AT fluid temperature sensor 32 remain at the upper or lower limits of their detection ranges, the transmission ECU 12 determines that the coolant temperature sensor 26 and the AT fluid temperature sensor 32 are faulty and the actual coolant temperature and AT fluid temperatures are not in the allowable ranges.

As such, the transmission ECU 12 may be regarded as "determination portion" that determines whether the detected coolant temperature and the detected AT fluid temperature are within the allowable ranges.

When it is determined that at least one of the coolant temperature sensor 26 and the AT fluid temperature sensor 32 is faulty and thus at least one of the coolant temperature and the AT fluid temperature is out of the allowable range, the transmission ECU 12 shifts the automatic transmission 5 to the speed indicated by sftrng.

When setting sftrngmap, the transmission ECU 12 may use the warming-up acceleration shift map instead of the normal-drive shift map.

Figure 6:
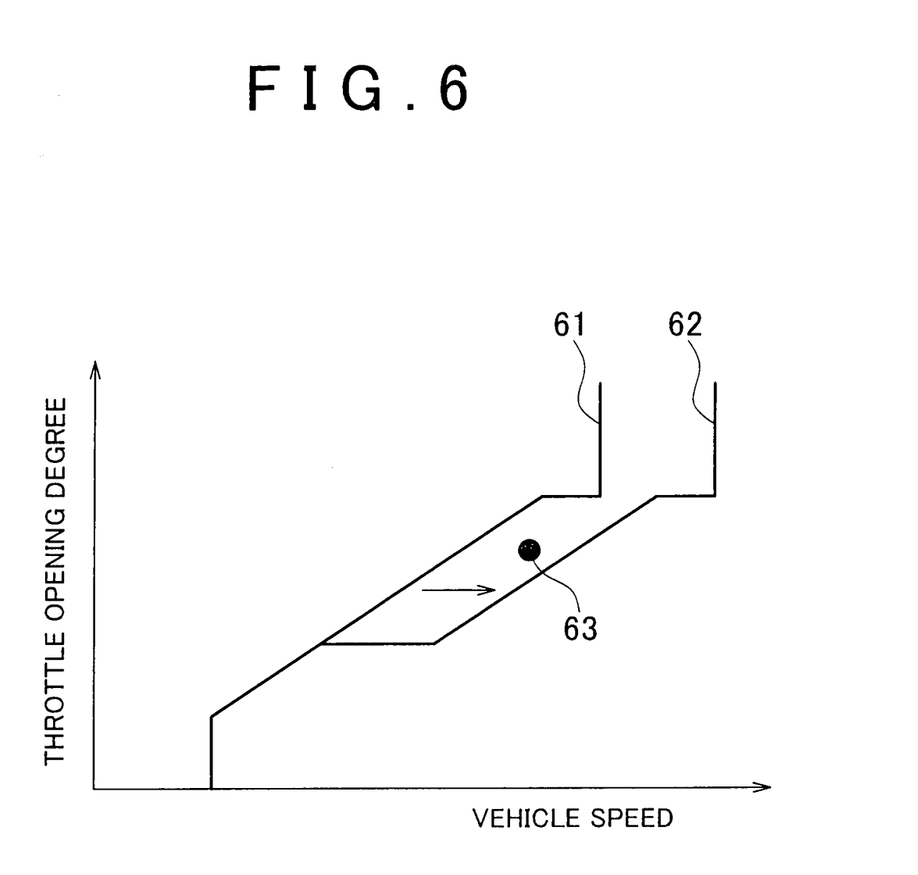
FIG. 6 is a chart comparing the shift line of the normal-shift map and the shift line of the warming-up shift map.

FIG. 6 is a chart showing the shift line of the normal-drive shift map and the shift line of the warming-up acceleration shift map for comparison.

Referring to FIG. 6, a curve 62 represents an upshift line in the warming-up acceleration shift map and a curve 61 represents an upshift line in the normal-drive shift map. As shown in the chart, in the region ranging upward from a predetermined level of the throttle opening degree, the upshift line 62 of the warming-up acceleration shift map is located further to the high speed side than the upshift line 61 of the normal-drive shift map is. Thus, for example, when the transmission ECU 12 determines that the engine 2 needs to be warmed up while the vehicle 1 is running at an operation point 63 shown in FIG. 6 where the throttle opening degree is larger than the predetermined level, the transmission ECU 12 selects the speed of the automatic transmission 5 according to the upshift line 62 of the warming-up acceleration shift map. In this case, therefore, sftrngmap is made smaller than when it is set according to the upshift line 61 of the normal-drive shift map, and this reliably delays upshift of the automatic transmission 5 in the manual mode.

Figure 7:
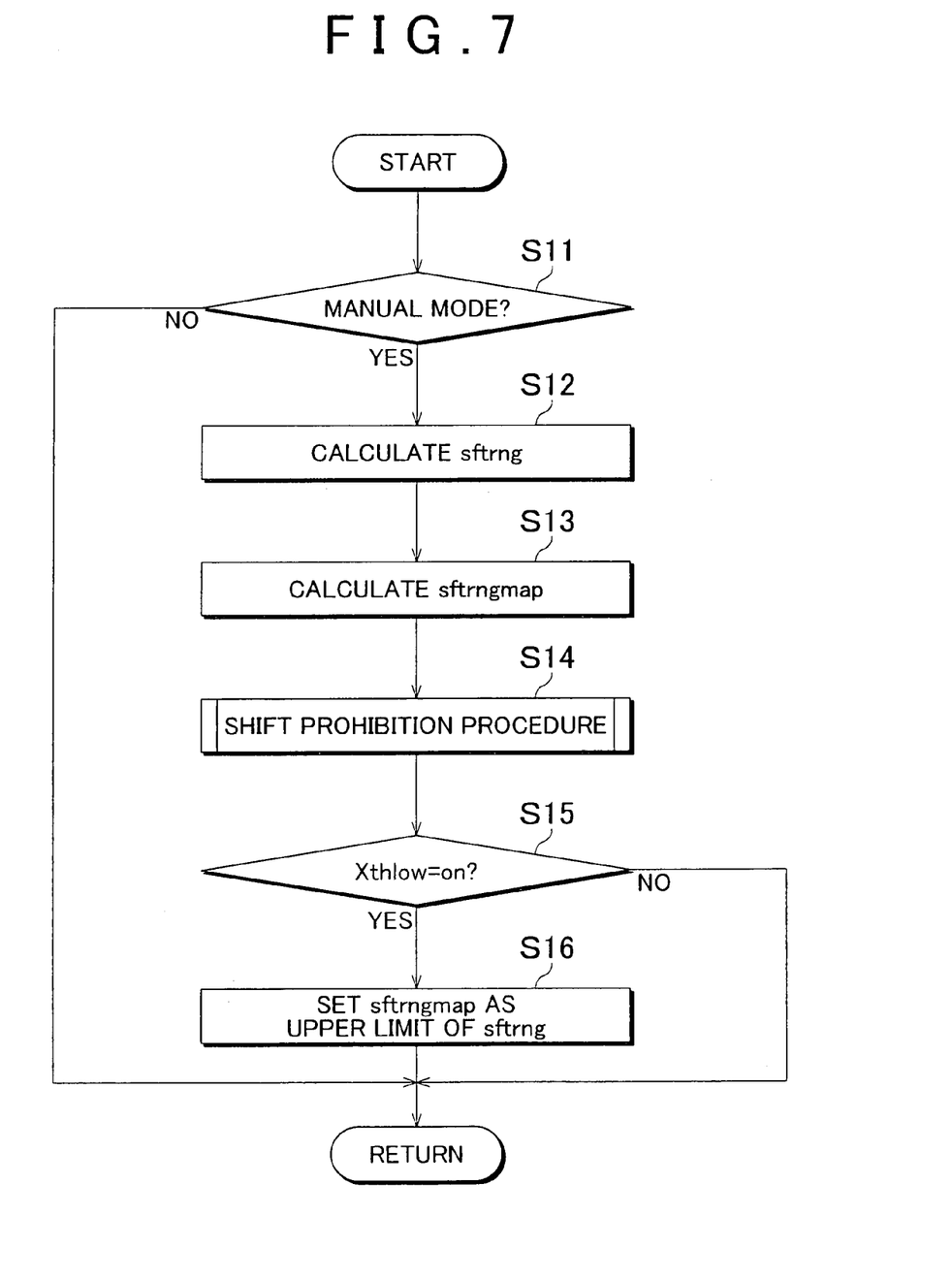
FIG. 7 is a flowchart illustrating the operation of the automatic transmission control apparatus of the example embodiment of the invention.
Figure 8:
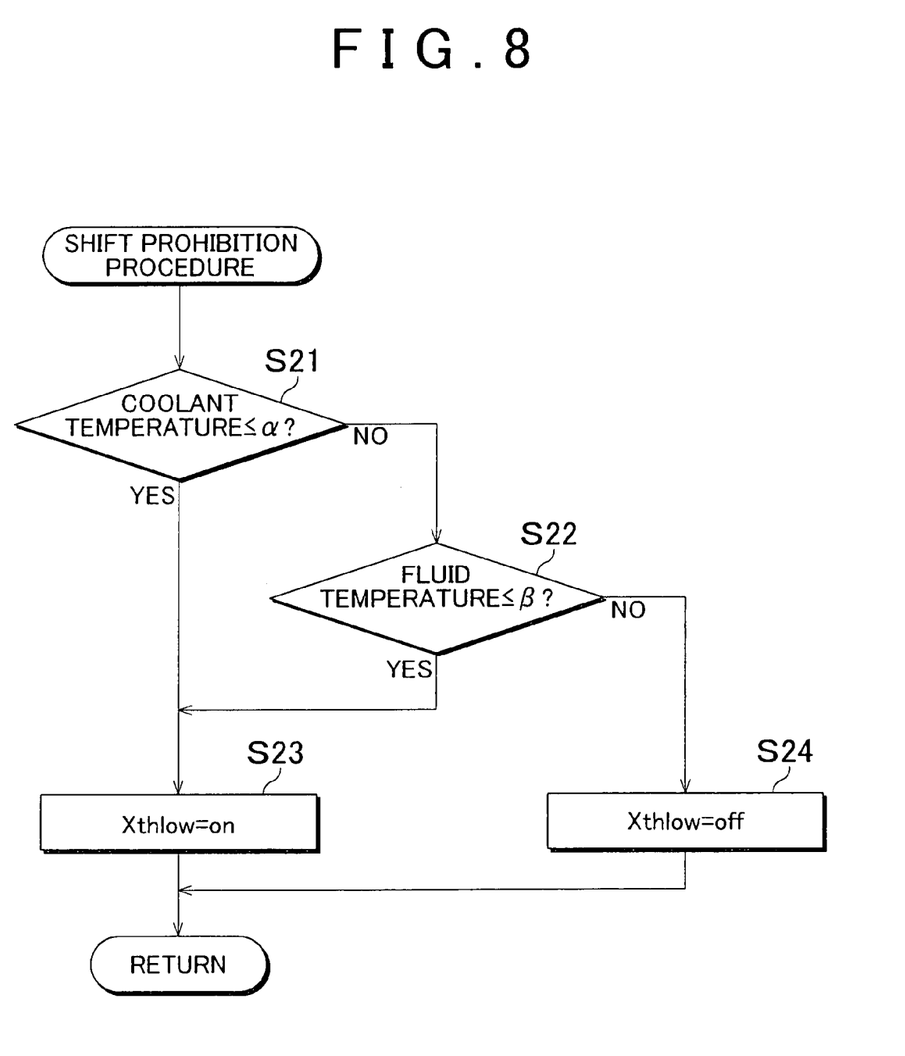
FIG. 8 is a flowchart illustrating a prohibition determination procedure.

The flowchart of FIG. 7 illustrates an operation routine of the automatic transmission control apparatus of this example embodiment. The flowchart of FIG. 8 illustrates a prohibition determination procedure.

The following procedure is provided as a program executable by the CPU of the transmission ECU 12 and the CPU repeatedly executes it at given time intervals.

First, the transmission ECU 12 determines whether the automatic transmission 5 is presently in the manual mode (step S11). More specifically, in this step, the transmission ECU 12 determines the automatic transmission 5 as being in the manual mode if the signals input from the shift position sensor 29 are indicating that the shift lever 28 is presently at the M position, the "+" position, or the "−" position. On the other hand, the transmission ECU 12 determines the automatic transmission 5 as being in the automatic mode if the signals input from the shift position sensor 29 are indicating that the shift lever 28 is presently at the D position.

If the transmission ECU 12 determines the automatic transmission 5 as being in the manual mode (step S11: YES), the transmission ECU 12 then proceeds to step S12. On the other hand, if the transmission ECU 12 determines the automatic transmission 5 as not being in the manual mode (step S11: NO), the transmission ECU 12 then finishes the present cycle of the routine.

In step S12, the transmission ECU 12 calculates sftrng representing the speed manually selected by the driver (step S12).

In this step, more specifically, if the transmission ECU 12 determines based on the signals of the shift position sensor 29 that the shift lever 28 is presently at the M position, the transmission ECU 12 sets sftrng to the present speed of the automatic transmission 5.

If the transmission ECU 12 determines that the shift lever 28 is presently at the "+" position, the transmission ECU 12 sets sftrng to a speed higher by one speed than the present speed of the automatic transmission 5 and starts time count. If the transmission ECU 12 determines that the shift lever 28 is presently at the "−" position, the transmission ECU 12 sets sftrng to a speed lower by one speed than the present speed of the automatic transmission 5 and starts time count. When the transmission ECU 12 determines that the shift lever 28 is presently at the "+" position or at the "−" position, the transmission ECU 12 refers to the timer. At this time, if the time counted by the timer is longer than zero, the transmission ECU 12 does not change the value of sftrng. If the time counted by the timer is longer than a predetermined value, it indicates that the shift lever 28 has been held at the "+" position or at the "−" position. In this case, the transmission ECU 12 adds 1 to or subtracts 1 from the present value of sftrng.

Subsequently, the transmission ECU 12 calculates sftrngmap representing the speed that is selected based on the shift map (step S13). More specifically, in this step, the transmission ECU 12 determines the throttle opening degree based on the signals input from the throttle sensor 24 and determines the speed of the vehicle 1 based on the signals input form the vehicle speed sensor 25. Then, the transmission ECU 12 calculates the value of sftrngmap corresponding to the determined throttle opening degree and vehicle speed using a shift map stored in the ROM.

Then, the transmission ECU 12 executes the shift prohibition determination routine shown in FIG. 8 (step S14).

In the shift prohibition determination routine, the transmission ECU 12 first determines whether the coolant temperature of the engine 2 is equal to or lower than the threshold $\alpha$ stored in the ROM (step S21). In this step, more specifically, the transmission ECU 12 determines, based on the signals input from the coolant temperature sensor 26, whether the coolant temperature is equal to or lower than the threshold $\alpha$. At this time, if the coolant temperature is equal to or lower than the threshold $\alpha$ (step S21: YES), the transmission ECU 12 then proceeds to step S23 and sets a prohibition determination flag xthlow to "on". On the other hand, if the coolant temperature is higher than the threshold $\alpha$ (step S21: NO), the transmission ECU 12 then proceeds to step S22.

If "NO" in step S21, the transmission ECU 12 then determines whether the AT fluid temperature is equal to or lower than the threshold $\beta$ stored in the ROM (step S22). In this step, more specifically, the transmission ECU 12 determines, based on the signals input from the AT fluid temperature sensor 32, whether the AT fluid temperature is equal to or lower than the threshold $\beta$. At this time, if the AT fluid temperature is equal to or lower than the threshold $\beta$ (step S22: YES), the transmission ECU 12 then proceeds to step S23 and sets the prohibition determination flag xthlow stored in the RAM to "on".

On the other hand, if the AT fluid temperature is higher than the threshold $\beta$ (step S22: NO), the transmission ECU 12 then proceeds to step S24 and sets the prohibition determination flag xthlow to "off".

Back to FIG. 7, the transmission ECU 12 determines whether the prohibition determination flag xthlow stored in the RAM is "on" (step S15). If so (step S15: YES), the transmission ECU 12 then proceeds to step S16. If not (step S15: NO), the transmission ECU 12 then finishes the present cycle of the routine.

Then, in step S16, the transmission ECU 12 sets sftrngmap as the upper limit of sftrng. In this step, more specifically, the transmission ECU 12 first compares the value of sftrng calculated in step S12 with the value of sftrngmap calculated in step S13. If sftrng is larger than the sftrngmap, the transmission ECU 12 controls the shifting of the automatic transmission 5 using sftrngmap. On the other hand, if sftrng is equal to or smaller than sftrngmap, the transmission ECU 12 controls the shifting of the automatic transmission 5 using sftrng.

While the CPU of the transmission ECU 12 executes the above-described routine at given time intervals in the example embodiment described above, the routine may alternatively be executed by, for example, the CPU of the engine ECU 11. In this case, the engine ECU 11 controls the hydraulic pressure control circuit 6 via the transmission ECU 12.

According to the automatic transmission control apparatus of the example embodiment, as described above, when the driver operates the shift lever 28 so as to shift the automatic transmission 5 up to a certain speed in the manual mode in a state where the engine 2 needs to be warmed up, the automatic transmission 5 is prohibited from being shifted up to the speed requested by the driver if it is higher than the speed that is selected based on the drive state of the vehicle 1, and this accelerates the warming-up of the engine 2 while preventing deterioration of the fuel economy and deterioration of the exhaust-gas purification capability which may otherwise be caused when the temperature of the engine 2 is low.

According to the automatic transmission control apparatus of the example embodiment of the invention, further, because the coolant temperature of the engine 2 is referenced in determining whether to prohibit the automatic transmission 5 from being shifted up to the speed requested by the driver when said speed is higher than the speed selected based on the drive state of the vehicle 1, the warming-up of the engine 2 can be accelerated reliably.

According to the automatic transmission control apparatus of the example embodiment of the invention, further, because the AT fluid temperature of the automatic transmission 5 is referenced in determining whether to prohibit the automatic transmission 5 from being shifted up to the speed requested by the driver when said speed is higher than the speed selected based on the drive state of the vehicle 1, the warming-up of the engine 2 can be accelerated more reliably.

According to the automatic transmission control apparatus of the example embodiment of the invention, further, the automatic transmission 5 is allowed to be shifted to the speed requested by the driver when it is determined that the detected coolant temperature or the detected AT fluid temperature is incorrect, and in this case, the driver can shift up the automatic transmission 5 as he or she desires and thus the drivability is high.

While the transmission ECU 12 references the detected coolant temperature and the detected AT fluid temperature in determining whether to allow or prohibit the automatic transmission 5 to be shifted to the speed requested by the driver in the foregoing example embodiment, the invention is not limited to this feature. For example, the transmission ECU 12 may be adapted to reference only one of the detected coolant temperature and the detected AT fluid temperature in determining whether to allow or prohibit the automatic transmission 5 to be shifted to the speed requested by the driver. In a case where the transmission ECU 12 references only the coolant temperature in determining whether to allow or prohibit the automatic transmission 5 to be shifted to the speed requested by the driver, the flag xthlow is set to "on" when the coolant temperature is equal to or lower than the threshold $\alpha$, and it is set to "off" when the coolant temperature is higher than the threshold $\alpha$. Likewise, in a case where the transmission ECU 12 references only the AT fluid temperature in determining whether to allow or prohibit the automatic transmission 5 to be shifted to the speed requested by the driver, the flag xthlow is set to "on" when the AT fluid temperature is equal to or lower than the threshold $\beta$, and it is set to "off" when the AT fluid temperature is higher than the threshold $\beta$.

Further, while the engine ECU 11 and the transmission ECU 12 are provided in the vehicle 1 in the example embodiment of the invention, the invention is not limited to this feature. For example, the engine ECU 11 and the transmission ECU 12 may be integrated in a single ECU.

Further, while sequential shifting in the manual mode is accomplished by the use of the shift lever 28 in the example embodiment of the invention, the invention is not limited to this feature. For example, an upshift switch for shifting up the shift range or the speed of the transmission and a downshift switch for shifting down the shift range or the speed of the transmission may be provided at the steering wheel of the vehicle 1, which is not shown in the drawings, and sequential shifting may be performed using these upshift and downshift switches.

The upshift switch and downshift switch may be an upshift paddle and a downshift paddle that output shift commands when pulled by the driver. In this case, the transmission ECU 12 detects the shift commands from the upshift and downshift paddles.

Further, the upshift switch and downshift switch may be an upshift button and a downshift button. For example, such upshift and downshift buttons may be provided at the right spoke and the left spoke of the steering wheel, respectively, or a pair of upshift and downshift buttons may be provided at the right spoke or the left spoke of the steering wheel or pairs of upshift and downshift buttons may be provided at both the right and left spokes.

Further, while the M position is included in the shift gate positions in the example embodiment of the invention, if the vehicle has an upshift switch and a downshift switch such as described above, the M position is not necessarily included in the shift gate positions. In this case, the transmission ECU 12 changes the shift mode of the automatic transmission 5 from the automatic mode to the manual mode in response to shift commands from the upshift switch or from the downshift switch. Further, when the upshift and downshift switches are pressed at the same time or when none of them has been pressed for a predetermined time, the transmission ECU 12 changes the shift mode of the automatic transmission 5 from the manual mode to the automatic mode.

While the above-described upshift prohibition in the manual mode has been performed based on the shift map used for the automatic mode in the example embodiment of the invention, it may alternatively be performed based on given shift prohibition information. In this case, for example, as the shift prohibition information, the transmission ECU 12 identifies the speed of the automatic transmission 5 that is set by an AI (Artificial Intelligence) shift control or by a cruise control and prohibits upshift of the automatic transmission 5 if the speed requested by the driver in the manual mode is higher than the speed set by the AI shift control or by the cruise control.

While the invention has been embodied as an automatic transmission control apparatus for FR vehicles in the foregoing example embodiment, the invention is not limited to such an application. For example, the invention may be embodied as an automatic transmission control apparatus for various types of vehicles including FF (Front-engine Front-drive vehicles) vehicles and all-wheel-drive vehicles.

Further, while the vehicle 1 incorporates the engine 2 as a drive force source in the example embodiment of the invention, the invention is not limited to this feature. For example, the vehicle 1 may alternatively be a hybrid vehicle having an engine and a motor-generator and using both as drive force sources.

Note that the automatic transmission 5 in the example embodiment of the invention is only exemplary and therefore the invention is not limited to this feature. For example, the invention may be applied to various continuously-variable transmissions (CVTs).

As such, the automatic transmission control apparatus of the invention provides an advantage that warming-up of the internal combustion engine can be accelerated even when the shift mode of the transmission is in the manual model, thus preventing deterioration of the fuel economy and deterioration of the exhaust-gas purification capability which may otherwise be caused when the temperature of the internal combustion engine is low.

The invention claimed is:

1. An automatic transmission control apparatus for an automatic transmission incorporated in a vehicle to transmit drive force produced by an internal combustion engine and having an automatic shift mode in which a speed of the automatic transmission is automatically selected based on the drive state of the vehicle and a manual shift mode in which the speed of the automatic transmission is selected according to a manual operation of a driver also in the state where the internal combustion engine needs to be warmed up, the automatic transmission control apparatus comprising:
a drive-state detection portion that detects the drive state of the vehicle;
a manual operation request detection portion that detects the speed of the automatic transmission requested by the manual operation;
an automatic shift selecting portion that selects the speed of the automatic transmission based on the detected drive state of the vehicle in the automatic shift mode;
a warming-up determination portion that determines whether the internal combustion engine needs to be warmed up; and
a shift prohibition portion that, in a state where the warming-up determination portion has determined that the internal combustion engine needs to be warmed up, shifts the automatic transmission to the speed that is selected by the automatic shift selecting portion if the speed detected by the manual operation request detection portion is higher than the speed that is selected by the automatic shift selecting portion.

2. The automatic transmission control apparatus according to claim 1, wherein
the warming-up determination portion determines that the internal combustion engine needs to be warmed up if the temperature of coolant of the internal combustion engine is equal to or lower than a predetermined value.

3. The automatic transmission control apparatus according to claim 1, wherein
the warming-up determination portion determines that the internal combustion engine needs to be warmed up if the temperature of fluid of the automatic transmission is equal to or lower than a predetermined value.

4. The automatic transmission control apparatus according to claim 1, further comprising a determination portion that determines whether the temperature of coolant of the internal combustion engine and the temperature of fluid of the automatic transmission are within allowable ranges, wherein
when the temperature of coolant is out of the allowable range or the temperature of fluid is out of the allowable range, the shift prohibition portion allows the automatic transmission to be shifted to the speed detected by the manual operation request detection portion even if the speed detected by the manual operation request detection portion is higher than the speed selected based on the drive state of the vehicle.

5. The automatic transmission control apparatus according to claim 1, wherein the shift prohibition portion allows the automatic transmission to be shifted to the speed detected by the manual operation request detection portion if the speed detected by the manual operation request detection portion is equal to or smaller than the speed that is selected by the automatic shift selecting portion and that is based on the drive state of the vehicle detected by the drive-state detection portion.

6. A method for controlling an automatic transmission incorporated in a vehicle to transmit drive force produced by an internal combustion engine and having an automatic shift mode in which a speed of the automatic transmission is automatically selected by an automatic shift selecting portion based on the drive state of the vehicle and a manual shift mode in which the speed of the automatic transmission is selected according to a manual operation of a driver also in the state where the internal combustion engine needs to be warmed up, the method comprising:
 detecting the drive state of the vehicle via a drive-state detection portion;
 detecting the speed of the automatic transmission requested by the manual operation via a manual operation request detection portion;
 determining, via a warming-up determination portion, whether the internal combustion engine needs to be warmed up; and
 shifting the automatic transmission to the speed that is selected by the automatic shift selecting portion, in a state where the internal combustion engine needs to be warmed up, if the speed requested by the manual operation is higher than the speed that is selected by the automatic shift selecting portion and that is based on the detected drive state of the vehicle.

7. The method according to claim 6, wherein
 it is determined that the internal combustion engine needs to be warmed up if the temperature of coolant of the internal combustion engine is equal to or lower than a predetermined value.

8. The method according to claim 6, wherein
 it is determined that the internal combustion engine needs to be warmed up if the temperature of fluid of the automatic transmission is equal to or lower than a predetermined value.

9. The method according to claim 6, further comprising determining whether the temperature of coolant of the internal combustion engine and the temperature of fluid of the automatic transmission are within allowable ranges, wherein
 when the temperature of coolant is out of the allowable range or the temperature of fluid is out of the allowable range, the automatic transmission is allowed to be shifted to the speed requested by the manual operation even if the speed requested by the manual operation is higher than the speed selected based on the drive state of the vehicle.

10. The method according to claim 6, further comprising:
 allowing, in a state where the internal combustion engine needs to be warmed up, the automatic transmission to be shifted to the speed requested by the manual operation if the speed requested by the manual operation is equal to or smaller than the speed that is selected by the automatic shift selecting portion and that is based on the detected drive state of the vehicle.

* * * * *